A. M. O'QUINN.
SIZER AND GRADER.
APPLICATION FILED SEPT. 24, 1918.
1,293,175.
Patented Feb. 4, 1919.
4 SHEETS—SHEET 2.
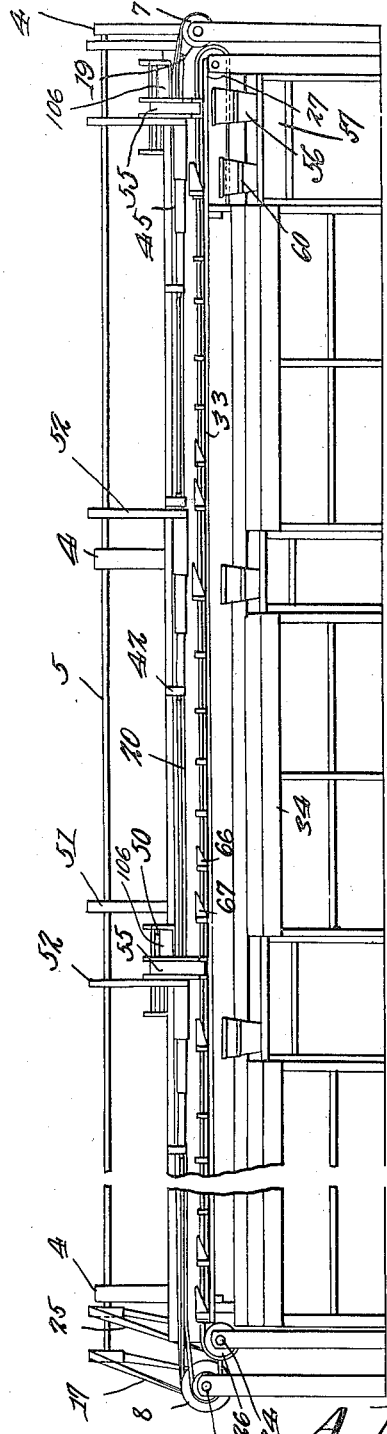
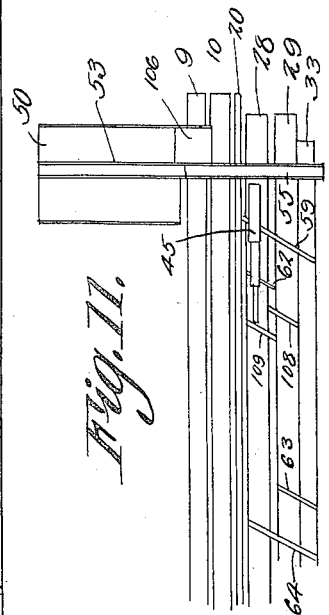
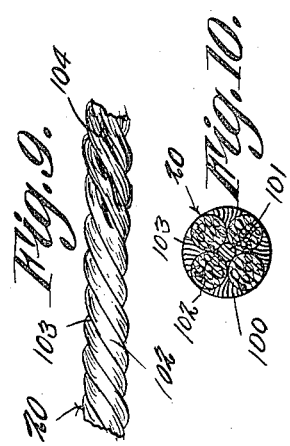
Inventor,
A. M. O'Quinn
By C. A. Snow & Co.
Attorneys.
Witness

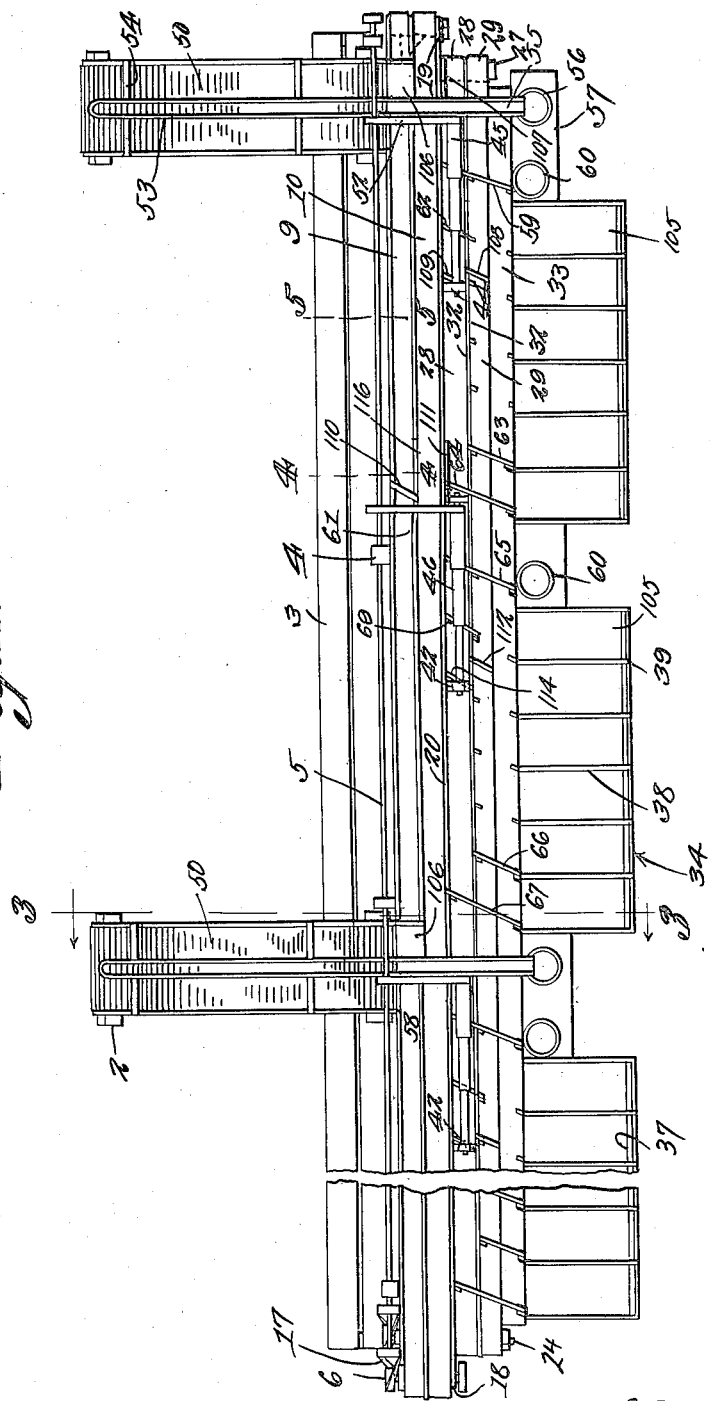

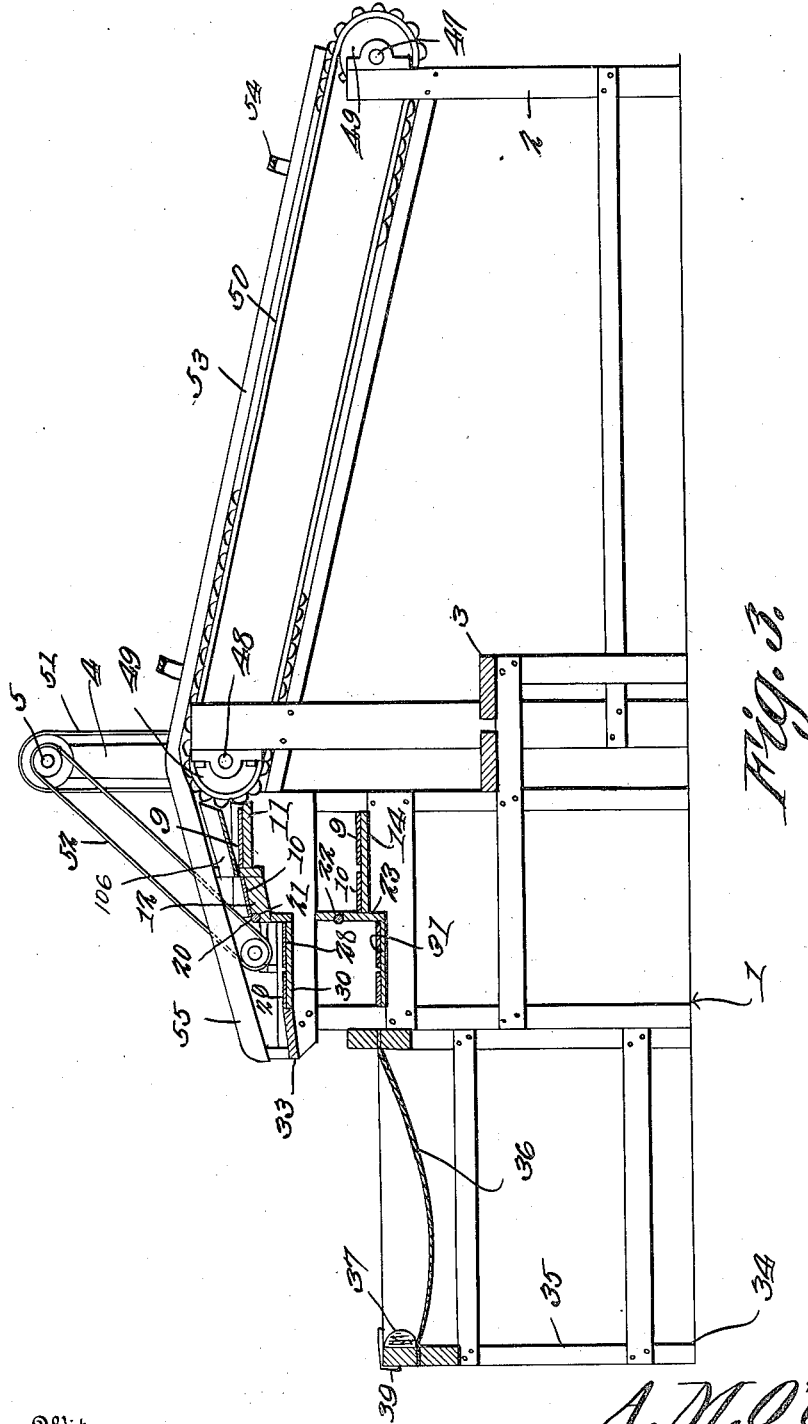

A. M. O'QUINN.
SIZER AND GRADER.
APPLICATION FILED SEPT. 24, 1918.
1,293,175.
Patented Feb. 4, 1919.
4 SHEETS—SHEET 4.
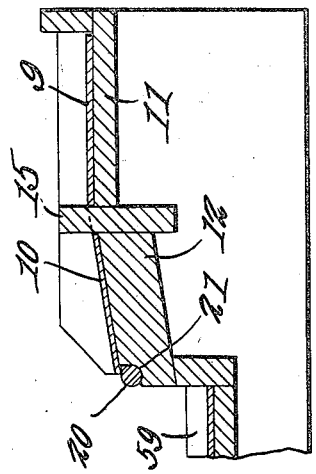
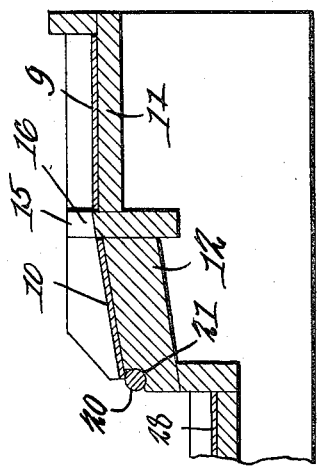
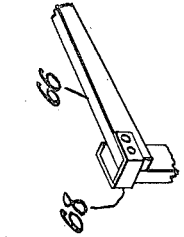
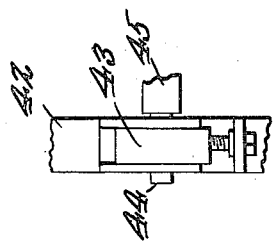
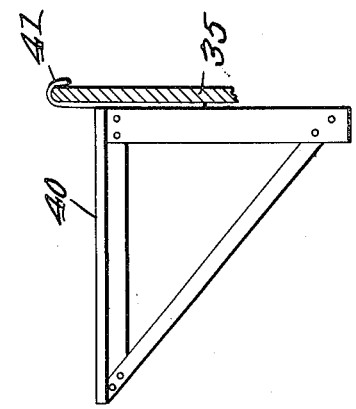
Inventor,
A. M. O'Quinn
Witness
By
Attorneys.

UNITED STATES PATENT OFFICE.

ARTHUR M. O'QUINN, OF FORT VALLEY, GEORGIA.

SIZER AND GRADER.

1,293,175.

Specification of Letters Patent.

Patented Feb. 4, 1919.

Application filed September 24, 1918. Serial No. 255,485.

*To all whom it may concern:*

Be it known that I, ARTHUR M. O'QUINN, a citizen of the United States, residing at Fort Valley, in the county of Houston and State of Georgia, have invented a new and useful Sizer and Grader, of which the following is a specification.

The device forming the subject matter of this application is a fruit and vegetable sizer and grader, and the invention aims to provide novel means whereby with a minimum expenditure of labor, a maximum capacity of fruits and vegetables may be graded according to size and quality, together with means whereby, after thus being sized and graded, they may be distributed gently, expeditiously and advantageously for packing in baskets or crates used for that purpose.

Another object of the invention is to provide novel means whereby the grading rollers will be prevented from being overloaded, novel means being supplied for distributing the material to be graded and sized, conveniently to and between the rollers, and novel means being supplied for distributing the material after having been sized and graded, so that the packing bins will receive at all times, an equal proportion of the fruit, and will not become overloaded at any one point, the arrangement being such that all packing employees may work to advantage at all times.

Another object of the invention is to provide novel means whereby a suitable distributing mechanism, of the kind hereinafter described, may be used in connection with a short sizer and grader, or with a small sizer or grader and still distribute the material sized and graded, to packing bins of capacity great enough to allow continuous receiving of the material.

Another object of the invention is to provide novel means whereby some of the material to be delivered may be carried through the machine without being sized and distributed.

A further object of the invention is to provide a sizing and grading machine wherein the material sized and graded may, after having been assorted, be mixed again, in lots of various sizes.

Another object of the invention is to provide novel means whereby the size of the compartments in the packing bins may be changed so as to accommodate the run of fruit.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention, parts being broken away; Fig. 2 is a side elevation, wherein parts are broken away; Fig. 3 is a cross section on the line 3—3 of Fig. 1; Fig. 4 is a fragmental cross section taken on the line 4—4 of Fig. 1; Fig. 5 is a fragmental cross section taken on the line 5—5 of Fig. 1; Fig. 6 is an elevation showing the packing bench; Fig. 7 is a fragmental elevation showing the means for adjusting the grading rolls; Fig. 8 is a perspective showing the means whereby any of the deflectors may be mounted adjustably; Fig. 9 is a fragmental side elevation showing a portion of the cable belt; Fig. 10 is a cross section of the cable belt; and Fig. 11 is a diagram showing the deflectors and certain other parts of the machine.

The numeral 1 marks a main frame, which need not be described in detail, because its construction for the most part is a matter of carpenter work. Projecting laterally from the main frame 1 are any desired number of auxiliary frames 2. The main frame 1 may carry a platform 3, along which an inspector may walk, during the grading operation, for the purpose of noting how the machine is working. The main frame 1 carries standards 4 in which a horizontal driving shaft 5 is journaled. A shaft 6 is journaled on the frame 1 at one end thereof and carries pulleys 8. Idle pulleys 9 are journaled on the frame 1 at the opposite ends thereof. A first belt 9 and a second belt 10 are passed about the pulleys 8 and 9. The first belt 9 is horizontally disposed, and its upper run is supported on a platform 11 constituting a part of the main frame 1. The second belt 10 slopes downwardly and transversely and is supported on a platform 12 constituting a part of the main frame 1. The lower runs of the belts 9 and 10 may be carried by a platform 14. There is a partition 15 between the belts 9 and 10, the partition being supplied with an opening 16. A driving belt 17 connects the shaft 6 with the driving shaft 5, and by this means the belts 9 and 10 may be advanced.

The shaft 6 carries a small grooved pulley 18, and at the opposite end of the frame 1 there is a small grooved idler 19. A cable belt 20 is engaged around the pulleys 18 and 19 and is, consequently, driven by the shaft 6, along with the belts 9 and 10. Since the pulleys 18 and 19 are of smaller diameter than the pulleys 7 and 8, the cable belt 20 moves more slowly than do the belts 9 and 10. The cable belt 20 operates at the outer edge of the belt conveyer 10 in a groove 21 fashioned in the edge of the platform 12. The lower run of the cable belt 20 may be received in a groove 22, formed in a partition 23, located below the platform 12, at the outer edge thereof.

Especial attention is directed at this point to the construction of the cable belt 20. The cable belt 20 may include a core 100 around which are wound strands 101, each of these strands being of considerable diameter. The construction is such that the cable belt 20 has a spiral surface, comprising a plurality of pronounced ribs 103 at the periphery of the cable belt. The ends of the cable belt 20 are united by a splice 104, or otherwise, so that there can be no relative transverse twisting or rotary movement between the ends of the cable belt. The cable belt 20 is to be distinguished clearly, so far as operation and construction are concerned, from a cable belt made of cotton or like material, and comprising a plurality of relatively small strands, which, although twisted to form a spiral, do not produce any marked spiral surface like that shown at 102 and including the pronounced ribs 103. All of the foregoing should be noted carefully, since the utility of this part of the device will be made manifest hereinafter.

A shaft 24 is journaled on one end of the main frame 1 and is connected by means of a belt 25 with the driving shaft 5. The shaft 24 carries pulleys 26 and at the opposite end of the frame 1 there are idlers 27. A third belt 28 and a fourth belt 29, disposed outwardly of the belt 28, are engaged with the pulleys 26 and with the idlers 27. The belts 28 and 29 are horizontally disposed, the upper runs of these belts being supported on a platform 30, and the lower runs of the belts being supported on a platform 31. The belt 28 lies adjacent to the cable belt 20 and slightly below the same. A sloping platform 33 is carried by the frame 1, at the side of the belt 29, and is downwardly and outwardly inclined.

Packing tables 34 may be disposed against the main frame 1, below the platform 33, each packing table comprising a frame 35 and a bottom 36 which concaves downwardly and slopes outwardly, the frame carrying a resilient buffer 37 disposed at the outer edge of the bottom 36, and serving to prevent the fruit from being bruised, when the fruit travels along the bottom 36. Partitions 38 extend across the frame 35 and coöperate with the bottoms 36 to form compartments 105. The partitions 38 may be removably mounted in place as shown at 39, so as to accommodate the size of the various compartments to the run of the fruit. If desired, packing benches 40 may be assembled by means of hooks 41 with the outer edge of the frames 35 of the packing tables 34.

The main frame 1 includes transverse supports 42 provided with adjustable bearings 43 in which is journaled a shaft 44 carrying a sizing roller 45 of any desired construction. The sizing roller 45 is mounted adjacent to one of the auxiliary frames 2, and between that frame and the next auxiliary frame, any desired number of sizing rollers 46 may be located. The sizing rollers 45 and 46 are driven by belts 52 from the shaft 5. The sizing rollers 45 and 46 are disposed opposite to the belts 20 and 10, above the belt 28.

The description of the construction of the machine will be temporarily suspended at this place, to point out certain novel features in the operation of the device.

When the fruit is advanced, the fruit is supported by the belts 10 and 20 and by the sizing roller 45, which form a runway for the fruit. The cable belt 20 aids in advancing the fruit, and exercises other important functions. It has been pointed out hereinbefore that the cable belt 20 is made up of strands 101 of relatively large diameter, presenting a spiral surface 102 comprising pronounced ribs 103, the ends of the cable belt being connected by a splice 104 or otherwise, so that there can be no relative rotary movement of the ends of the cable belt about its axis. Because the cable belt 20 has the spiral surface 102, a slow rotary movement will be imparted to the cable belt, this operation being brought about by the engagement between the spiral surface 102 of the cable belt and the grooved pulley 18 and the grooved idler 19 about which the cable belt passes. The direction in which the upper run of the cable belt 20 rotates slowly, will depend on the direction of the twist of the strands 101, but, preferably, the cable belt is so mounted in the groove 21 that the top portions of the belt and the roller rotate in opposite directions away from each other. The fruit runway is formed in the following manner:—the belt conveyer 10, traveling upon the inclined fixed member 12, partially laps over onto the cable conveyer 20, which is moving forward in the same direction as the belt conveyer 10, but preferably at a slower speed. Thus there is provided novel means for supporting and revolving the material being sized and graded. Neither the belt conveyer 10 nor the cable conveyer 20 alone coacts with the sizing roller 45 to form a fruit runway, but the edge of the belt conveyer 10 (moving at a different speed than the cable conveyer 20) and the cable conveyer, slowly rotating on its own axis as it moves forward, form one side of the fruit runway, the sizing roller forming the other side.

This construction has a further advantage. If at any time the fruit runway should become choked, the material coming up behind the point of congestion will ride up on the inclined belt conveyer 10, and, after passing point of congestion, the incline of the belt conveyer causes the material to go again into the runway, whereupon the material is again subjected to the sizing process.

While the fruit is supported on the runway above alluded to, the cable belt 20 will not only aid in advancing the fruit, but will impart a slow rotary movement to the fruit, along an approximately vertical axis passing through the stem and the butt ends of the fruit.

Presupposing that peaches are being sized, the peaches will travel along with their longer axes approximately vertical. The stem ends of the peaches, and the opposite butts thereof, which are the most tender parts of the peach, will not come into contact with the sizing roller 45, the cable belt 20, or the belt 10 and, consequently, the fruit will be sized and graded in the machine without bruising or injuring those parts of the fruit which are most likely to be injured in the operation of a sizing and grading machine. In view of the foregoing, it will be obvious that there is a clear and manifest reason why the cable belt 20 should be so constructed that it will have an axial rotation, at the same time that the upper run of the cable belt is advanced.

Resuming the description of the construction of the machine, it may be stated that a shaft 47 is journaled on the outer end of each auxiliary frame 2, a shaft 48 being journaled in the inner end of each auxiliary frame. The shafts 47 and 48 carry sprocket rollers 49, about which is trained an upwardly inclined conveyer belt 50. The conveyer belt 50 is actuated by a belt 51, driving the shaft 48 from the shaft 5. A receiver 53 extends longitudinally of the conveyer belt 50 and is located above the same, the receiver being supported by means of brackets 54 or in any other desired way, from the auxiliary frame 2. The receiver 53 has no bottom, and the conveyer belt 50 moves directly beneath the receiver, so that the material in the receiver will be advanced by the belt. The receiver 53 discharges into a trough like chute 55, supported on the main frame 1 and extends outwardly, across and above the belt conveyer 9, the belt conveyer 10, the cable belt 20, the belt conveyer 28, the belt converer 29 and the sloping platform 33. The chute 55 discharges into a receptacle 56, mounted on a stool 57, located between the ends of the packing tables 34. It will be obvious, however, that the receptacle 56 may be supported in any desired way.

From this point forwardly, it will be profitable to describe simultaneously, the operation of parts of the machine, and the location of those parts. Presupposing that the observer is facing the machine as disclosed in Fig. 1, it may be stated that operators stand on each side of the auxiliary frames 2. The peaches are placed on the conveyer 50 and are carried upwardly. The operators pick out the cull peaches, as the same are advanced by the conveyer 50 and throw the cull peaches to one side. The number two peaches, which are edible, are picked out by the operators and are placed in the receiver 53. The belt 50 carries the second grade peaches upwardly within the receiver 53, the high grade peaches being carried upwardly by the belt, on each side of the receiver. The number two grade peaches roll down the chute 55, and are deposited in the receptacle 56.

Recalling that the observer is supposed to be facing the machine as shown in Fig. 1, the path traversed by the peaches on the right hand side of the receiver 53 will now be traced out.

The fruit on the conveyer belt 50 at the right hand side of the receiver 53, is advanced by the conveyer belt, and moves downwardly along an inclined chute 106, transversely of and above the belt 9, the fruit being deposited on the transversely inclined belt 10, which causes the fruit to roll against a bumper 107 on the frame. The fruit is now acted upon by the cable belt 20 and the inclined conveyer belt 10 on the one side, and the sizing roller 45 on the other side. The smallest size of fruit passes between the conveyers 10 and 20, and the sizing roller 45 onto the belt 28 and is transferred from that belt to the belt 29 by an inclined deflector 59, the fruit rolling across the sloping platform 33 into a receptacle 60 on the stool 57.

The next size of fruit passes between the conveyers 10 and 20, and the intermediate part of the grading roll 45, upon the belt 28 and is carried by an inclined deflector 62 upon the belt 29. A deflector 108 extends across the belt 29 and transfers the fruit upon the sloping platform 33, from whence the fruit passes into certain of the compartments 105. The next largest size of fruit passes between the conveyers 10 and 20, and the smallest portion of the sizing roller 45, onto the conveyer 28, and is directed by a deflector 109 upon the belt 29, in advance of the deflector 108. The fruit on the belt 29 is engaged by a deflector 63 and passes across the sloping platform 33 into the proper compartments 105.

The largest size of fruit, which passes the full length of the roller 45, without being sized, falls over the end of the roller 45, upon the conveyer 28, by which it is carried forward until engaged by a deflector 64 extended transversely of the platform 33, the belt 29 and the belt 28, this portion of the fruit being delivered by the deflector 64 into the proper compartments 105.

The fruit on the conveyer belt 50 to the left of the receiver 53, passes upon the belt 9 and is received by the partition 15. The belt 9 advances the fruit until an inclined deflector 110 extended transversely of the belt 9, is encountered, whereupon the fruit passes through the opening 16 in the partition 15 and rolls across the belt 10 against a bumper 111. The fruit is then advanced by the belt 10 and is sized by the roller 46 in the way hereinbefore described, various deflectors being supplied, the deflector 65 corresponding to the deflector 59, the deflector 112 corresponding to the deflector 108, the deflector 66 corresponding to the deflector 63, the deflector 69 corresponding to the deflector 62, the deflector 114 corresponding to the deflector 109 and the deflector 67 corresponding to the deflector 64.

Especial attention is again directed to the fact that the upper run of the cable belt 20 has a rotary movement about its axis. As a consequence, a rotary movement is imparted to the fruit about an approximately vertical axis, passing through the stem and butt ends of the fruit, and, at the same time, the fruit is advanced bodily. The fruit, consequently is not sized at the ends of the axis passing through the stem and butt ends but is sized at the ends of another axis, at right angles to the axis passing through the stem and the butt, and at the place where the diameter of the fruit is greatest.

Having thus described the invention, what is claimed is:—

1. In a fruit and vegetable grading machine, a sizing roller; and a member extended longitudinal of the roller, said member moving in the direction of its length, and rotating upon its axis.

2. In a fruit and vegetable grading machine, a sizing roller rotating in one direction; and a member extended longitudinally of the roller, said member moving in the direction of its length, and rotating on its axis in an opposite direction.

3. In a fruit and vegetable grading machine, a sizing roller; pulleys; and a cable conveyer traversing the pulleys longitudinally of the roller, the cable conveyer having pronounced spiral ribs, which, coöperating with the pulleys, impart an axial rotation to the cable conveyer.

4. In a fruit and vegetable grading machine, a sizing roller; a belt conveyer movable longitudinally of the sizing roller and inclined transversely toward the sizing roller, the belt conveyer and the sizing roller forming a fruit runway; a cable conveyer movable longitudinally of the sizing roller and located between the sizing roller and the belt conveyer; and means for imparting a rotary movement to the cable conveyer about its axis.

5. In a fruit and vegetable grading machine, a sizing roller; a platform inclined transversely toward the sizing roller and provided with a groove; a belt conveyer movable longitudinally of the platform and longitudinally of the sizing roller; a cable conveyer movable in the groove, longitudinally of the belt and the roller and disposed between the belt and the roller; and means for imparting a rotary movement to the cable conveyer, about its longitudinal axis, as the cable conveyer is advanced.

6. In a fruit and vegetable grading machine, a sizing roller; a belt conveyer movable longitudinally of the sizing roller; a member extended longitudinally of the roller and located between the roller and the conveyer; means for advancing said member at a slower speed than that at which the conveyer is advanced; and means for rotating said member around its longitudinal axis.

7. In a device of the class described, longitudinally spaced first and second sizing rollers; a first conveyer movable longitudinally of both rollers; a second conveyer movable longitudinally of both rollers and disposed between the first conveyer and the rollers, the second conveyer discharging laterally on both rollers; means for directing one part of the fruit to be sized across the first conveyer and upon the second conveyer adjacent the first sizing roller; means for directing another part of the fruit to be sized upon the first conveyer; and means for deflecting said part of the fruit from the first conveyer to the second conveyer adjacent the forward end of the second sizing roller.

8. In a fruit and vegetable grading machine, a grading roller; a conveyer operating beneath and longitudinally of the roller; a laterally sloping platform extended longitudinally of the roller; another conveyer operating longitudinally of the roller at one side thereof and between the roller and the first specified conveyer; a deflector disposed adjacent the forward end of the roller and extended across both conveyers and across the platform; a second deflector extended across the first conveyer and located adjacent the rear end of the roller; a third deflector extended across the first conveyer and located between the first and second deflectors; and a fourth deflector extended across the second conveyer, the fourth deflector being located between the second and third deflectors.

9. A device of the class described, constructed as set forth in claim 8, and further characterized by the provision of a fifth deflector spaced from the rear end of the roller and extended across both conveyers and across the platform; and a sixth deflector located between the fifth deflector and the second deflector, and extended across the second conveyer and the platform.

10. In a fruit and vegetable grading machine, a sizing roll; a belt conveyer movable longitudinally of the sizing roll; means for supporting the belt conveyer at a transverse downward incline toward the sizing roll; a cable conveyer movable longitudinally of the sizing roll at the edge of the belt conveyer and adjacent to the sizing roll; and means for driving the conveyers at different speeds.

11. In a fruit and vegetable grading machine, a sizing roller; a platform inclined transversely toward the sizing roller and provided with a groove; a cable conveyer movable in the groove, longitudinally of the sizing roller; and a transversely inclined belt conveyer movable upon the platform longitudinally of the cable conveyer and the sizing roller, the conveyers on the one hand, and the roller on the other hand, forming a fruit runway.

12. In a fruit and vegetable grading machine, a sizing roller; a fixed member provided with a groove and inclined downwardly toward the roller; a cable conveyer movable in the groove; means for rotating the cable conveyer on its longitudinal axis; a belt conveyer movable upon the inclined fixed member; and means for moving the belt conveyer at a faster speed than the cable conveyer.

13. In a fruit and vegetable grading machine, a sizing roller; a fixed member inclined downwardly toward the roller and provided with a groove; a cable conveyer mounted to move longitudinally in the groove and to rotate on its axis therein; a belt conveyer movable longitudinally on the fixed member and inclined downwardly toward the roller; one edge of the belt conveyer extending partially over the cable conveyer in contact therewith, the conveyers and the roller forming a fruit runway; and means for advancing the conveyers at different speeds.

In testimony that I claim the foregoing as my own, I have hereto affixed my signature in the presence of two witnesses.

ARTHUR M. O'QUINN.

Witnesses:
  MASON B. LAWTON,
  IVY E. SIMPSON.